(12) United States Patent
Engstrom

(10) Patent No.: US 7,456,534 B2
(45) Date of Patent: Nov. 25, 2008

(54) ROTATING ELECTRICAL MACHINE

(75) Inventor: Staffan Engstrom, Lidingo (SE)

(73) Assignee: Newgen Generator AB, Lidingo (SE)

( * ) Notice: Subject to any disclaimer, the term of this patent is extended or adjusted under 35 U.S.C. 154(b) by 506 days.

(21) Appl. No.: 10/543,384

(22) PCT Filed: Jan. 27, 2004

(86) PCT No.: PCT/SE2004/000100

§ 371 (c)(1),
(2), (4) Date: Jul. 26, 2005

(87) PCT Pub. No.: WO2004/068678

PCT Pub. Date: Aug. 12, 2004

(65) Prior Publication Data

US 2006/0097582 A1    May 11, 2006

(30) Foreign Application Priority Data

Jan. 27, 2003   (SE) .................... 0300186

(51) Int. Cl.
*H02K 7/18* (2006.01)
(52) U.S. Cl. ................... 310/75 C; 310/90
(58) Field of Classification Search .......... 310/73, 310/67 A, 75 A, 90; 362/500, 192, 193
See application file for complete search history.

(56) References Cited

U.S. PATENT DOCUMENTS 6,002,187 A * 12/1999 Ohkura et al. ............ 310/67 A
6,424,066 B1    7/2002 Watson et al.
7,018,071 B1 *  3/2006 Belousova et al. .......... 362/282

FOREIGN PATENT DOCUMENTS

DE       2822993     11/1979

* cited by examiner

*Primary Examiner*—Thanh Lam
(74) *Attorney, Agent, or Firm*—Young & Thompson

(57) ABSTRACT

A rotating electrical machine is described, wherein the rotor (1) is rotatably journalled to the stator (3) via bearing devices (5, 16) arranged in or adjacent to an air gap between the rotor (1) and the stator (3).

17 Claims, 7 Drawing Sheets

ROTATING ELECTRICAL MACHINE

BACKGROUND OF THE INVENTION

This is a 371 National Stage application of International Application No. PCT/SE2004/000100, filed Jan. 27, 2004, and claims priority to Swedish Patent Application No. 0300186-4, filed Jan. 27, 2003.

The present invention relates to a rotating electrical machine, comprising two mutually rotary main parts comprising of a stator and a rotor.

In prior art machines, regardless if the machine has been intended for use as a motor or as a generator, the rotor traditionally has been built around a central shaft rotatably journalled to the stator.

Also for very large diameter machines, the rotor has earlier traditionally been constructed and carried by the stator in said way. At such very large machines, e.g. electrical generators with a diameter of several meters, to be driven by low speed hydro turbines or wind turbines, these design principles have considerable drawbacks. Due to the need to achieve and maintain a high precision in the air gap between the rotor and the stator, which also for very large machines has to be quite small, and generally a few millimeters, one has to design the stator and the rotor very rigid and heavy. This means that the production costs will be very high. The largest achievable diameter is thus in practice quite limited.

Thus, the objective of the invention is to create an improved electrical machine of the type mentioned in the introduction, in which the drawbacks of the mentioned prior art machines can be avoided.

BRIEF SUMMARY OF THE INVENTION

The machine, which according to the invention is proposed for this purpose, is characterised primarily by that the rotor is rotatably journalled to the stator by means of bearing devices arranged in or adjacent to the air gap between these two main parts.

By utilising bearing devices arranged in or adjacent to the air gap instead of centrally arranged bearing devices, for providing rotatable bearing of the rotor to the stator, it is possible to limit the need for stiffness of the main parts of the machine, that is necessary to provide the desired size of the air gap, to the sections of the main parts of the machine that are directly adjacent to the air gap. This means that both the stator and the rotor can be built considerably lighter than previously was possible and that the machine can be built with a considerably larger diameter. This is especially important for electrical generators intended to be directly driven by low speed hydro turbines and wind turbines. The reason why it is advantageous to make such generators with as large diameter as possible, is that it allows a reduction of the amount of electrically and magnetically active material. For a rotating electrical machine with a radial air gap, the achievable power is proportional to the air gap diameter squared and linearly proportional to the length of the air gap, whereas the necessary amount of electrically and magnetically active material is linearly proportional to both the air gap diameter and the length of the air gap.

The bearing devices preferably comprise at least one continuous bearing race that is arranged at one of the main parts and in the peripheral direction thereof, and at least one set of bearing elements arranged at the second main part at intervals in the peripheral direction thereof. The bearing devices are arranged to be in contact with a co-operating bearing race of said first main part.

It is suitable that the bearing elements are constituted by rolling elements, rotatably journalled to said second main part. Alternatively, they may be constituted by gliding elements connected to said second main part.

Furthermore, the bearing elements can preferably be made to be in resilient contact with the bearing race. Advantageously, the machine can be made to allow for an adjustment of the contact pressure between the bearing elements and the bearing race.

In a similar way as in prior art machines, the rotor may be constituted by a radial inner element, and the stator by a radial outer element extending annularly around the rotor.

However, according to a preferred embodiment of the invention, the stator instead is constituted by a radial inner element, whereas the rotor is constituted by a radial outer element, extending annularly around the stator and encloses the same. Such a reverse position of the rotor in relation to the stator, facilitates the achievement of a low weight of the machine.

The invention is further described below with reference to the enclosed drawings, in which

DETAILED DESCRIPTION OF THE INVENTION

Figure 1:
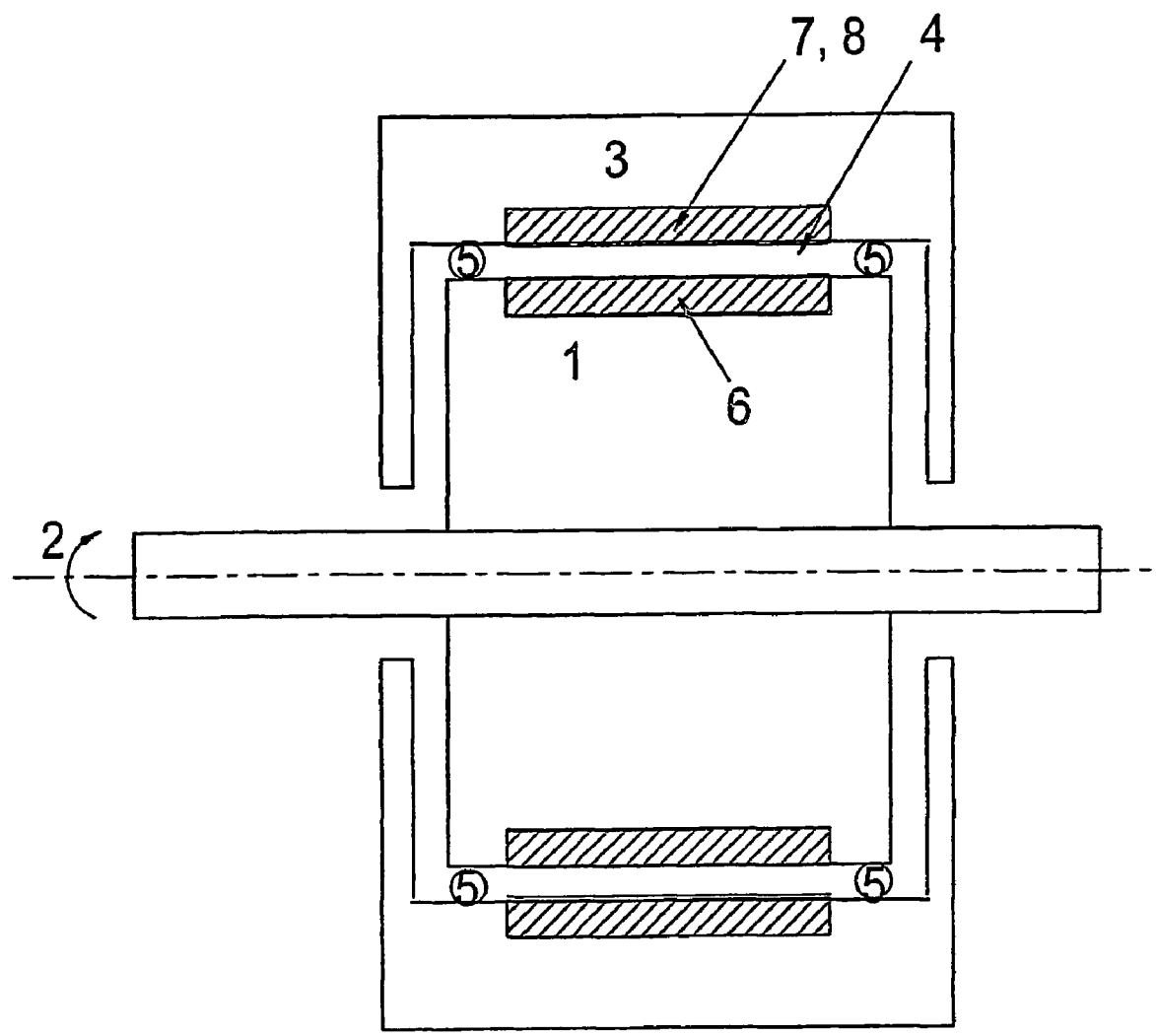
FIG. 1 schematically illustrates the general construction of an electrical machine according to the invention.

FIG. 1 illustrates schematically the general principle for a rotating electrical machine according to the invention. It preferably has a large diameter in relation to its length and many poles, and is designed for a low rotational speed. A diameter which is large in relation to the length, here refers to the diameter being equivalent to at least twice the length. The machine comprises a rotor, which in general is designated as 1, and can rotate around the longitudinal axis 2 of the machine and is enclosed by the in general as 3 designated stator. Between the two main parts of the machine comprising the rotor 1 and the stator 3, there is a radial air gap 4.

The rotor 1 is rotatably journalled to the stator by means of the schematically depicted bearing devices 5, which in FIG. 1 are depicted in the air gap 4 but also may be arranged outside but adjacent to it. The electrically and magnetically active parts of the rotor and the stator have been designated 6 and 7, 8 respectively and include all necessary iron cores, windings and, where applicable, permanent magnets.

The basic principle of the invention is that the rotor is rotatably journalled to the stator by means of bearing devices arranged in or adjacent to the air gap. This means that the bearing devices are arranged at generally the same radial distance from the centre of the machine as the air gap, instead of the prior art bearing devices which carry a shaft which is rigidly connected to the rotor. According to the invention, this principle can also be applied on machines with an axial or a transversal air gap. It can also be applied on machines with two or more air gaps, created by dividing the stator and/or the rotor, axially or radially, into several sections arranged mutually at intervals.

For an electrical machine with a large diameter made according to the above described basic principle, it is unfavourable or impossible to utilise conventional sliding or rolling bearings as bearing devices. Therefore, other types of bearing devices are used in the embodiments depicted in FIG. 2-6.

Furthermore, the rotor 1 in the embodiment depicted in FIG. 2-6 is made as a radial outer element extending annularly around the stator 3 that is built as a radial inner element. The rotor poles may be formed by permanent magnets 6, which due to manufacturing reasons each may comprise several parts. The magnets are fixed to a load-carrying, annular rotor structure 9, preferably by gluing.

The stator 3 is made of a large number of steel laminations 7 and is furnished with windings 8. The steel laminations are kept together by means of tension rods 10, which extend in the axial direction through the lamination package and through two annular flanges 11 on each side of the package. The stator will in this way present an annular outer body with high stiffness. This body is connected to an inner central part of the stator by means of spoke-like tension rods 12, which contribute to the desired stator stiffness. Preferably, the flanges 11 consist of several arc-shaped curved sections connected to each other.

The bearing devices, which serve for rotatable bearing of the rotor 1 in relation to the stator 3, comprise two bearing races 16, formed by an inwardly bent end part of each flange 11 which races run continuously in the peripheral direction of the flanges. They furthermore comprise two sets of bearing elements 5, which are located by the rotor body at intervals in the peripheral direction thereof, and are furthermore arranged as pairs of rolling elements arranged to be in contact with one for each set of co-operating bearing race 16. Each rolling element 5 may e.g. comprise an outer annular element 19 of steel or similar durable material, being rotatably journalled to a spindle 26, which is connected to a resilient holder 14 carried by the rotor body 9. In order to enable adjustment of the contact pressure between the ring 19 and the co-operating bearing race 16 of the stator 3, the spindle 26 may be arranged in a way to permit a limited displacement in the radial direction in relation to the holder 14, e.g. by supplying it with an eccentric casing 20. In order to promote a smooth and silent operation of each rolling element 5, the ring 19 may be connected to the spindle 26 by means of an inner annular element 18 of elastic material. Alternatively the ring 19 may be furnished with an outer coating of elastic material.

According to an alternative embodiment of the invention, instead of the rotatable rolling elements serving as bearing elements 5, using gliding elements connected to the rotor 1 and co-operating with the bearing races 16. At least those parts of the gliding elements, which are intended to be in contact with the bearing races, may consist of a suitable plastic material with or without contained oil, or of a sintered and oil impregnated metallic material. Also in this case, the bearing elements may be in a resilient contact with the bearing race, with an adjustable contact pressure that is.

It also shall be mentioned that one instead of having bearing races connected to the stator and bearing elements connected to the rotor, one can utilise bearing races connected to the rotor and bearing elements connected to the stator.

Figure 5:
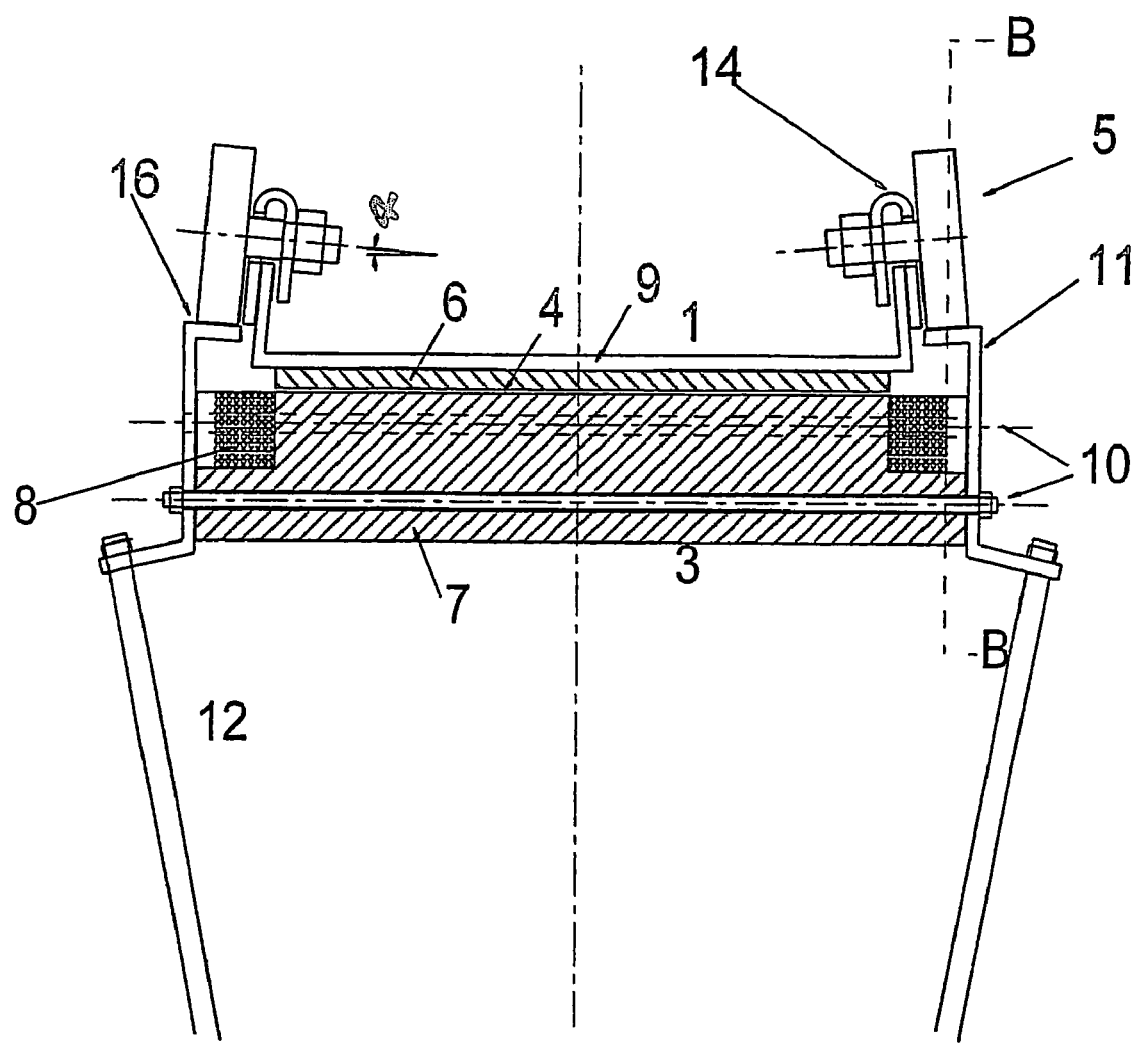
FIG. 5 is a partial view, in section along the line A-A in FIG. 4.
Figure 6:
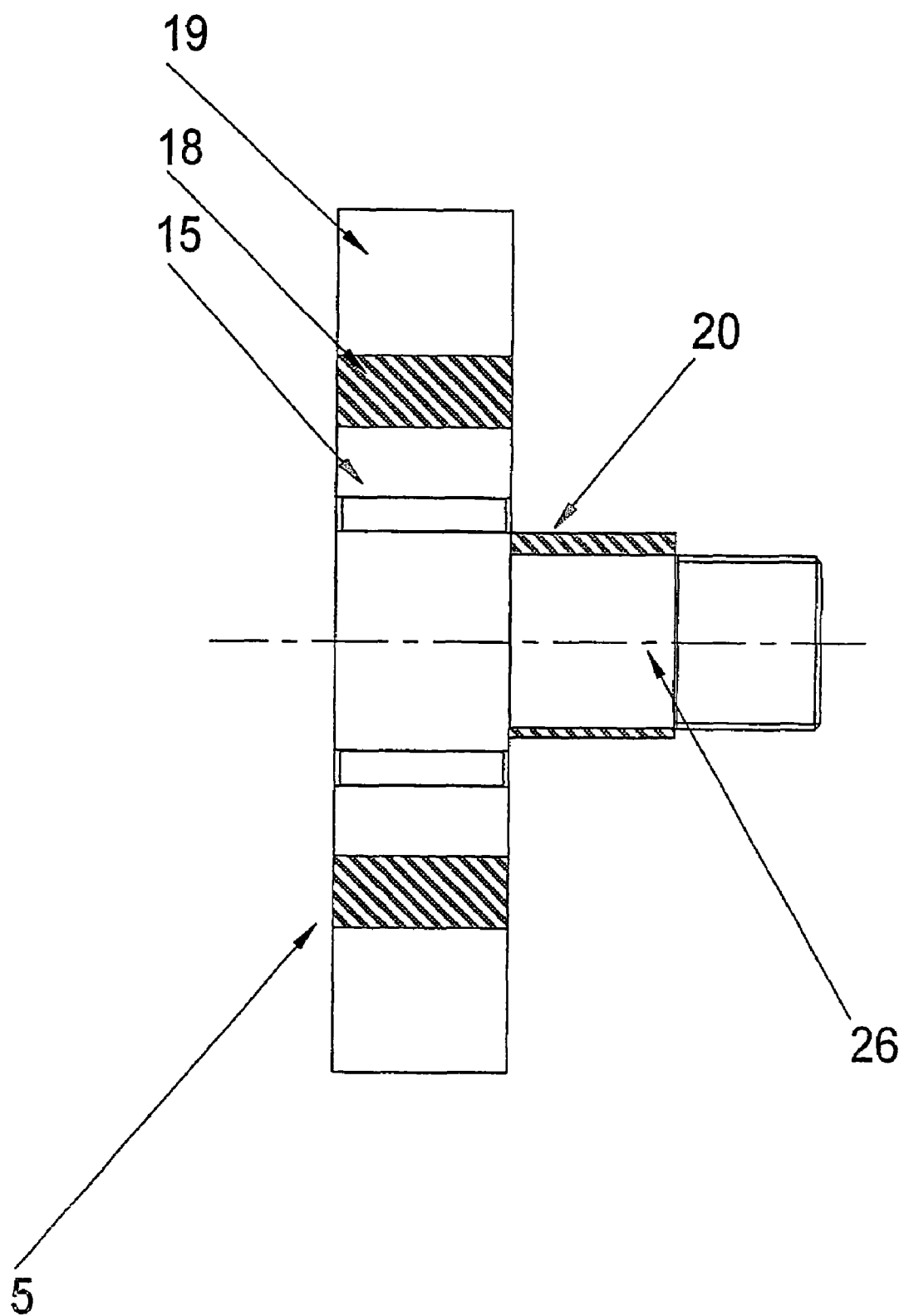
FIG. 6 is a sectional view of one of several rolling elements serving as bearing devices in the machine.

Regardless if the bearing elements 5 are made as rolling elements or gliding elements, they may be arranged in a way to ensure guidance of the rotor in axial direction in relation to the stator. As depicted in FIG. 5, the rolling elements 5 may e.g. be arranged with their rotation axis forming an angle in relation to the centre axis 2 of the generator.

Both the rotor and the stator may formed by several consecutive sections that may be joined together in the peripheral direction in an arbitrary, suitable way.

Figure 2:
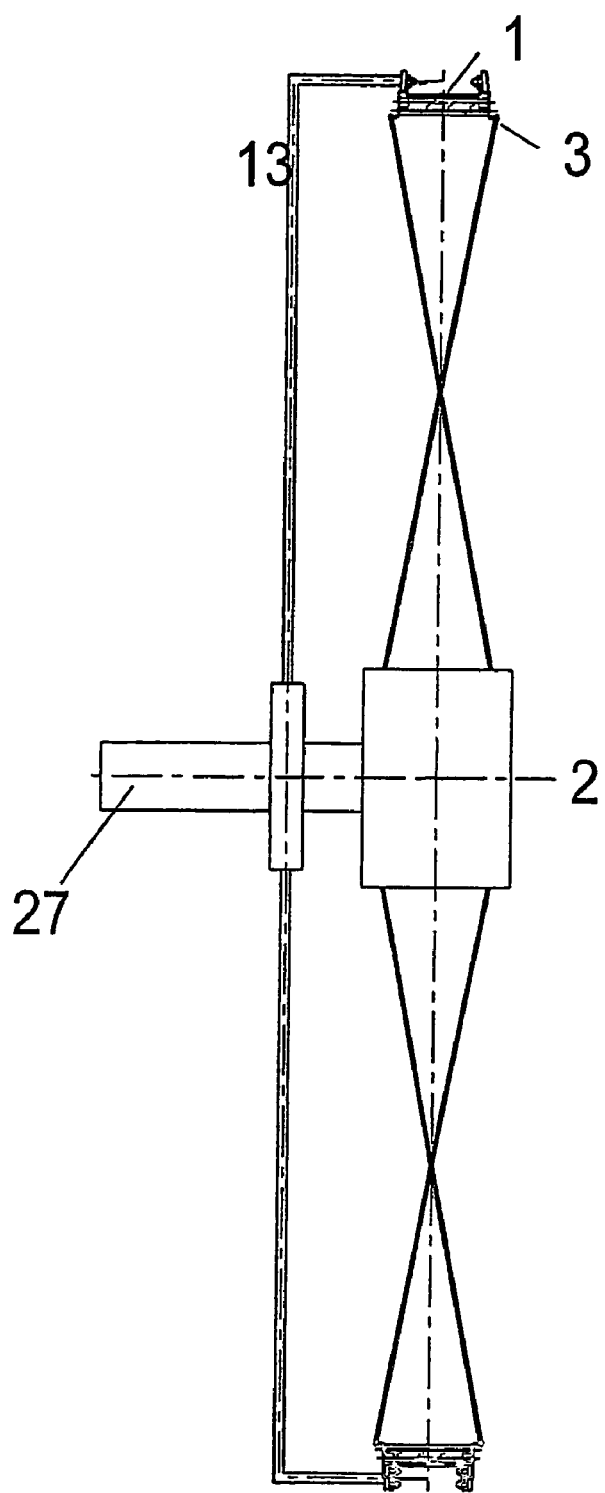
FIG. 2 depicts a longitudinal section of an electrical machine only as an example of a practical embodiment of the invention.
Figure 3:
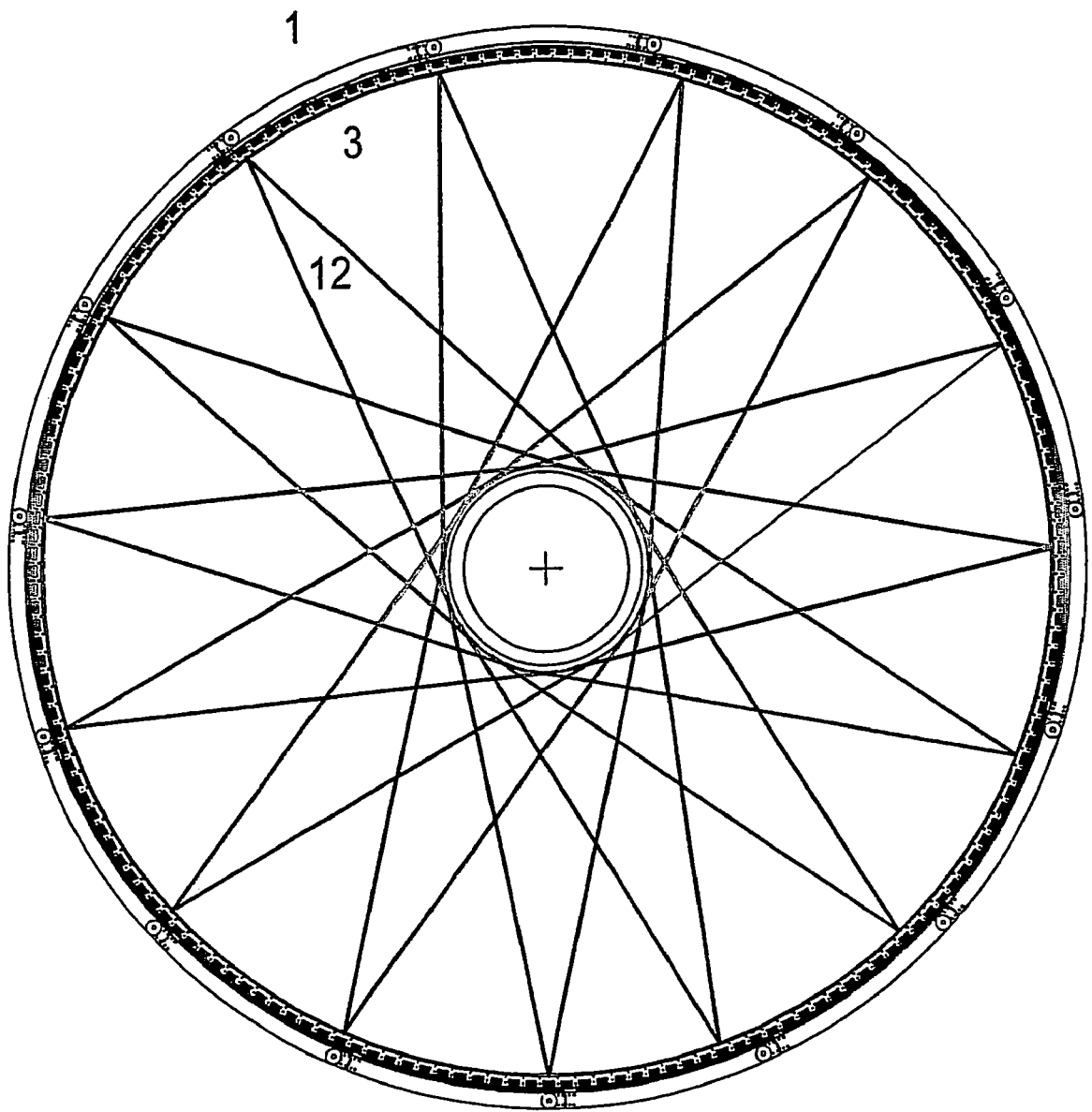
FIG. 3 is an end section of the machine according to FIG. 2.
Figure 4:
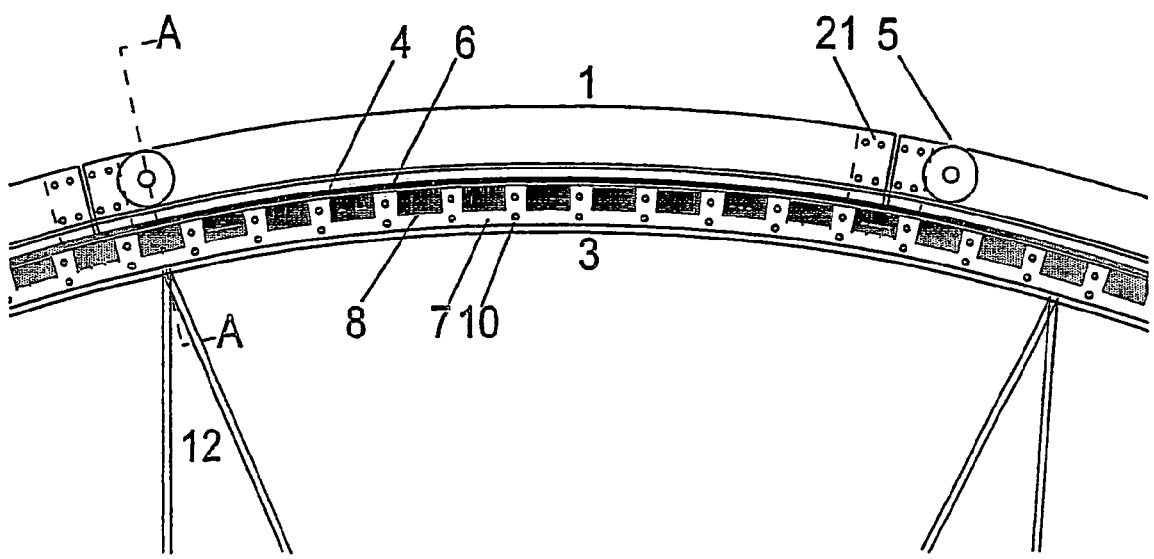
FIG. 4 represents an enlarged part of FIG. 3.

For transmitting torque from an outer shaft 27 to the rotor 1 or vice versa, the rotor may be furnished with a carrier 13, which in FIG. 2 is only schematically outlined.

If the machine is a generator driven by a wind turbine, it will be exposed to periodic torque variations that vary with the rotational speed and may cause torsional oscillations. Furthermore, all electrical machines are exposed to severe periodic oscillations at an eventual short circuit. In order to avoid or at least minimise the effect of such oscillations, it may be advantageous to include a certain elasticity and/or damping in the system.

For this purpose the connection created by the rods 12 between the inner and outer parts of the stator 3 may be arranged resilient and/or dampening. Alternatively, or in addition, the carrier 13 may be furnished with such qualities. With regard to the characteristics during a short circuit, the natural frequency for alternating current machines shall be roughly ⅔ of the electrical frequency. The natural frequency is dependant of the mass-moment of inertia and of the spring constant of the system.

In order to avoid that the very strong magnetic pressures that are acting between the rotor and the stator create inconveniently large bearing pressures and friction losses, it is suitable to design the machine in a way that said magnetic forces to a large extent are absorbed as strain in the rotor material, rather than by the bearing devices 5, 16 only. For this purpose, the contact pressure of the bearing devices may be adjusted, e.g. by using the adjustment function of the eccentric casings 20.

During operation, the temperature of both rotor and stator will increase. A considerable difference in temperature between rotor and stator then may develop. In order to avoid that this causes excessive bearing forces, it is advantageous, as mentioned earlier, to mount the bearing elements 5 to resilient holders 14.

Figure 7:
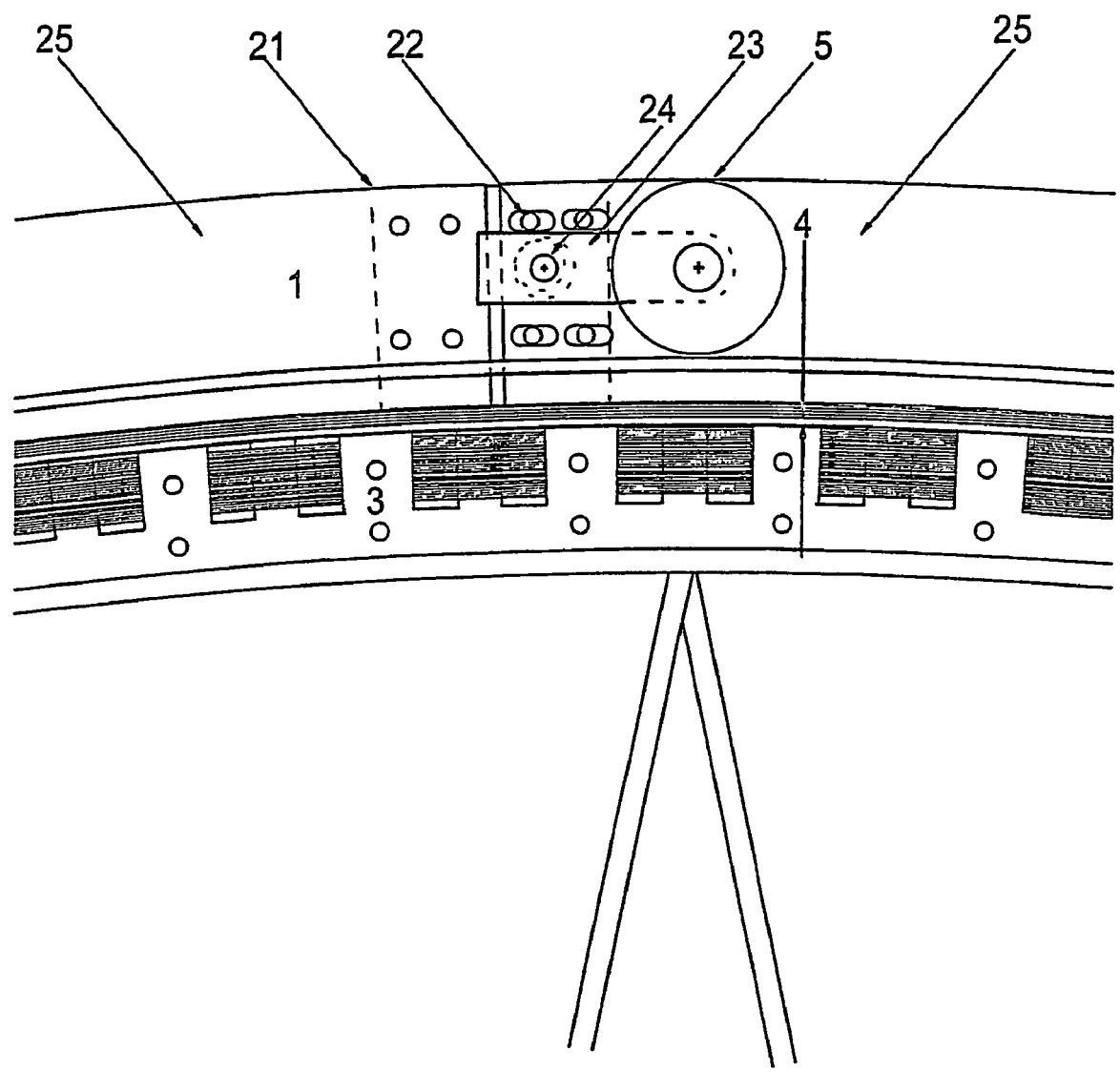
FIG. 7 is a partial view in section, depicting an alternative way of mounting mentioned rolling elements.

In some cases the temperature difference between the rotor and the stator will become large (several tens of degrees). For machines with a very large diameter, the arrangement described above then may be insufficient. The machine then may be complemented with a self-adjusting arrangement, which adjusts the size of the air gap and the bearing pressure. FIG. 7 depicts a possible design of such a device. The magnetic forces tend to attract the rotor 1 to the stator 3 and in this way decrease the air gap 4, and furthermore move adjoining rotor sections 25 towards each other. In order to achieve the desired adjustment function, the bearing element 5 is journalled in a lever 23, which at a radial movement of the bearing element by way of an eccentric 24 creates a tangential relative movement between the sections 25. This movement is possible since the fitting 21, which connects the two rotor sections 25 with each other, is connected with one of the rotor sections by means of pins in oval holes 22 or some other similar arrangement. The eccentric 24 is designed in a way that the gear ratio between the movement of the lever 23 and of the relative movements of the rotor sections, varies with the position of the elements mentioned. By dimensioning the different components in a suitable way, one can ensure that a state of equilibrium is achieved at the desired contact pressure and air gap 4. If the stator 3 gets warmer than the rotor 1, it will increase its size in relation to the rotor, at which the bearing device 5 is moved in the outwards radial direction. Both rotor sections 25 will then move away from each other, which will at least approximately restore the air gap 4 and the contact pressure to the desired values.

Due to economical reasons, one can not force the demands of stiffness and accuracy shape too far. Larger tolerances may be acceptable if the rotor intentionally is made compliant in one or several dimensions, which brings that it without high material stress or large contact pressure may be combined with a stator with deviations from the stated shape. During rotation, the rotor then will be slightly deformed. The compliance may be achieved by making the rotor sections themselves compliant, and by making the joint elements 21 between them compliant. Alternatively, the machine can be made with a compliant stator and a rigid rotor. The above mentioned solutions are facilitated due to the low rotational speed of large diameter electrical machines, which means moderate accelerations and thus moderate forces at eventual deviations in shape.

As earlier mentioned, generation and diffusion of noise from the bearing devices, may be counteracted by utilisation of rolling elements with an elastic outer coating or an elastic insert. The steel package of the stator constitutes a construction part with a high interior damping, which also brings a limitation of the noise.

Also the earlier mentioned compliant character of the spoke-like stator rods 12 and of the carrier 13 which is coupled to the rotor, may help to prevent diffusion of vibrations and noise. Furthermore, the rods 12 may be provided with vibration dampers, which according to previously know principles may be composed of a mass, a spring and a damper, which connects the mass with the object whose vibrations shall be damped. In certain cases the desired function may be achieved without a damper and possibly without a spring.

Another way to decrease the noise diffusion is to coat the free outer surfaces of the rotor and of the stator, or to fill cavities in those components with a material with a high interior damping, e.g. certain viscoelastic materials or concrete.

It is suitable to start the manufacture of the machine by assembling the stator. Subsequently, the rotor sections are mounted at the stator one at a time and connected with the earlier mounted sections by a suitable method.

If the rotor shall be provided with permanent magnets, the rotor sections may be mounted with the permanent magnets 6 either un-magnetised or magnetised. In the fist case, the magnetisation can be achieved by one or several of the stator poles being designed and dimensioned for this purpose, and by using with a suitable temporary power supply. This equipment also may be used for demagnetising the permanent magnets of the rotor if desirable, e.g. due to handling reasons in case of possible dismantling. Alternatively, separate magnetising equipment is temporary fitted to the stator.

In conclusion, the invention enables production of electrical machines, especially power generators for low rotational speed, with less consumption of material than before, which leads to considerable economical benefits.

The invention claimed is:

1. A rotating electrical machine, comprising two mutually rotatable main parts consisting of a stator and a rotor wherein
    the rotor is rotatably journalled to the stator by means of bearing devices arranged in or adjacent to an air gap between the two main parts to provide a desired size of the air gap, and
    diameters of the main parts are considerably larger than their lengths.

2. The rotating electrical machine according claim 1, wherein the stator is a radial inner element and the rotor is a radial outer element, extending annularly around the stator.

3. The rotating electrical machine according to claim 2, wherein the stator presents an outer annular body, which is supported by an inner central part of the stator by means of spoke-like tension rods.

4. The rotating electrical machine according to claim 3, wherein the tension rods are furnished with vibration dampers.

5. The rotating electrical machine according to claim 3, wherein the tension rods are made to form a resilient connection between the outer annular body of the stator and the inner central part of the stator.

6. The rotating electrical machine according to claim 1, wherein the bearing devices comprise at least one continuous bearing race that is arranged in a peripheral direction of the first of the two main parts, and at least one set of bearing elements is arranged at intervals in a peripheral direction of the second of the two main parts, made to be in contact and co-operating with one bearing race of said first of the two main parts.

7. The rotating electrical machine according to claim 6, wherein the bearing elements are constituted by rolling elements rotatably journalled to said second of the two main parts main part.

8. The rotating electrical machine according to claim 6, wherein the bearing elements constitute gliding elements connected to said second of the two main parts.

9. The rotating electrical machine according to claim 6, wherein the bearing elements are made to be in a resilient contact with the bearing race.

10. The rotating electrical machine according to claim 9, that is arranged to enable adjustment of the contact pressure between the bearing elements and the bearing race.

11. The rotating electrical machine according to claim 1, wherein the bearing devices are arranged to act as combined radial and axial bearing devices.

12. The rotating electrical machine according to claim 6, wherein the bearing elements are arranged with an inner or outer layer of elastic material.

13. The rotating electrical machine according to claim 1, that is arranged with means capable of adjusting air gap size and the contact pressure between co-operating bearing devices.

14. The rotating electrical machine according to claim 1, wherein the rotor is resiliently connected to an outer shaft by a carrier means capable of transmitting torque between said shaft and the rotor.

15. The rotating electrical machine according to claim 1, wherein at least one of the two main parts is formed by several consecutive sections that are connected with each other in the peripheral direction of the rotating electrical machine.

16. The rotating electrical machine according to claim 15, wherein said consecutive sections are limitedly mutually movable.

17. A power station, comprising a generator consisting of a rotating electrical machine, comprising two mutually rotatable main parts consisting of a stator and a rotor, wherein
    the rotor is rotatably journalled to the stator by means of bearing devices arranged in or adjacent to an air gap between the two main parts providing the desired size of the air gap, and
    diameters of the main parts are considerably larger than their lengths.

* * * * *